United States Patent [19]
Dornier et al.

[11] Patent Number: 4,815,181
[45] Date of Patent: Mar. 28, 1989

[54] TENTERING CHAIN TRACK FOR TENTERING CLAMPS TRAVELLING IN A CLOSED-LOOP IN A TENTERING FRAME

[75] Inventors: Peter Dornier; Rudolf Langer; Hans-Jürgen Maierhofer, all of Lindau, Fed. Rep. of Germany

[73] Assignee: Lindauer Dornier Gesellschaft mbH, Lindau, Fed. Rep. of Germany

[21] Appl. No.: 152,310

[22] Filed: Feb. 3, 1988

[30] Foreign Application Priority Data

Feb. 3, 1987 [DE] Fed. Rep. of Germany ....... 3703097

[51] Int. Cl.⁴ .............................................. D06C 3/02
[52] U.S. Cl. .......................................... 26/91; 26/92; 34/158
[58] Field of Search .................. 26/89, 91, 92; 34/158

[56] References Cited

U.S. PATENT DOCUMENTS 4,639,984 2/1987 Langer .

FOREIGN PATENT DOCUMENTS 1504507 6/1971 Fed. Rep. of Germany .
1264238 5/1961 France .
1361927 4/1964 France ................................ 26/92
2178077 2/1987 United Kingdom ................. 26/92

Primary Examiner—Robert R. Mackey
Attorney, Agent, or Firm—W. G. Fasse; D. H. Kane, Jr.

[57] ABSTRACT

In a film stretching machine having tentering chains travelling in an endless loop, the forward advance tracks of the tentering chains are laterally adjustably arranged within the machine housing for adjusting to fit different material web widths and for adjusting the lateral or widthwise stretching ratio. The tentering chain reversal guide arrangements at the inlet and outlet ends of the machine are correspondingly laterally slidably adjustable. The return tracks for the tentering chains are arranged outside of the housing in a fixed position and orientation relative to the housing. Straight transition guide portions pivotally connect the stationary return chain tracks to connection points of the respective laterally movable reversal guide arrangement. The straight transition guide portions are each articulated at one end to the respective return chain track and at the other end to the respective reversal guide arrangement. The return chain tracks may be either open or completely closed channels.

8 Claims, 2 Drawing Sheets

TENTERING CHAIN TRACK FOR TENTERING CLAMPS TRAVELLING IN A CLOSED-LOOP IN A TENTERING FRAME

FIELD OF THE INVENTION

The present invention relates to a tentering chain track for tentering clamps travelling along an endless loop in a tentering frame. The invention especially relates to a tentering chain track for machines enclosed by a housing for laterally stretching thermoplastic synthetic film webs in an essentially widthwise direction.

DESCRIPTION OF THE PRIOR ART

Such a tentering chain track arrangement includes two tentering chains guided along each of the two edges of the web to be treated, consecutively, along a forward or advance track section run, around guide sprockets, and then back along a reverse or return track section run. The chain track is divided into several straight segments. In order to adjust the widthwise stretching ratio, the guide sprockets and the articulated connecting elements of the straight segments, arranged opposite one another across the film web, are movable perpendicularly to the web transport direction symmetrically with respect to the web centerline.

Machines for stretching synthetic material webs in the widthwise or crosswise direction, as indicated above, are equipped with an endless loop tentering chain at both the right and left edges of the material web to be stretched. The tentering clamps of the two tentering chains grasp the respective opposite edges of the material web and stretch the web between the two chains spaced apart from each other. Over at least a portion of the path of the chains, the chains and the attached tentering clamps diverge as seen in the forward travel direction, whereby a stretching of the synthetic material web is achieved in its crosswise direction, so that the web is drawn out into a synthetic thin film. At the web inlet and outlet ends of the tentering machine, the tentering chains run over respective reversal guide arrangements, such as chain sprockets. The guide sprockets simultaneously serve to drive the chains. The chain track segments described above may be adjusted to extend more or less in parallel or divergently relative to the segments of the opposite chain track, depending on requirements. In each track segment, the forward track sections and the reverse track sections are interconnected in a parallelogram type structure essentially in the plane of the web, and may be moved as a parallelogram unit perpendicularly to the web travel direction. In order to achieve this, the chain track segments, or rather the articulated elements connecting two consecutive segments, are mounted on spindles. The desired lateral adjustment of the chain track segments may be achieved through an adjustment arrangement, such as spindle hand wheels. In most cases, the entire parallelogram structure of the chain track segments, including the forward and return track sections, extends completely in the housing which encloses the entire film stretching machine. Only the reversal guide arrangements, such as chain sprockets, located at the inlet and outlet ends of the machine lie outside of the machine housing.

In these known stretching machines with tentering chains, problems arise which result in considerable economical disadvantages and structural difficulties. Heat balance considerations play an important role in these problems because the costs of heating the synthetic web and of cooling the tentering chains are considerable. not only is energy directly required for heating the synthetic material web, but energy must also be supplied to balance substantial heat losses. These losses include, for example, heat losses at the web inlet and outlet slots through the housing of the machine. These specific losses are caused to a substantial extent because not only the thin web must pass through a narrow slot, but the chain tracks to the right and left of the web, including their forward and reverse track sections, must also pass through the slots. Because the chain tracks must be laterally adjustable in order to fit different width webs and in order to adjust the stretching ratio, and because the chain tracks are substantially thicker than the material web, the slot openings must be quite long and at least partly quite wide. Furthermore, the widened end regions of the slots, which accommodate the tentering chains and chain tracks, are quite difficult to close or seal effectively around the chain track arrangement.

A certain improvement may be achieved by departing from the above described parallelogram arrangement of the chain track segments. Namely, the tentering chains may be guided or reversed by an angle greater than 180° around the reversal guide arrangements. Then the forward and return runs of each chain converge from the respective reversal guide sprocket toward the last articulated element of the chain track at the inlet and outlet zones. By these means, a reversal guide arrangement having a relatively large radius of curvature is provided while achieving, nevertheless, a spatially compact arrangement of the forward and reverse track sections or runs and chain portions running close to one another in the machine housing. In principle, the parallelogram construction of the chain track segments is maintained, but the long sides, or rather the forward and return track sections or runs of each parallelogram lie very close to each other. Through these measures, the structural width of the entire machine is reduced, and the slot for passage of the web is shortened. The energy balance, or rather energy efficiency, is improved in the just mentioned construction, because the forward and return sections or runs of the chain track are arranged close to each other, so that the heat losses through the web passage slots are reduced. However, a further problem, common to all machines which guide the tentering chain return portion inside the housing, remains.

The just mentioned problem is caused because the tentering chains must be cooled on their return path. This chain cooling is quite difficult to carry out within the machine housing. For example, as disclosed in the French Patent Publication No. 1,264,238, the return portion of the tentering chain is guided through a special canal equipped with cooling coils within the housing. The fact alone that a cooling operation is to be carried out within the heated housing incurs considerable disadvantages and costs, and requires special efforts to achieve. Especially for long machines, as they are in common use today, the length of the cooling canals must be subdivided, and several coolant supply and return lines must be provided at intervals along the length of the canals. These coolant flow lines must not only be thermally insulated within the housing, they must also be flexibly or movably arranged so that the lateral adjustment of the chain tracks is not hindered.

In the machine described in the German Patent Publication (DE-AS) No. 1,504,507, the return path of the tentering chain is completely removed out of the housing and instead directed externally. Through this measure, firstly additional space is gained within the housing, and secondly the thermal efficiency is improved because a cooling operation is no longer required inside the heated interior of the machine. The cooling of the chain may be effectively carried out through simple means external to the machine, because the external space is inherently cooler than the machine interior. The tentering chain return portion or runs may be guided through a canal or duct through which cooling air flows.

On the one hand, an external chain return offers advantages for machines with a large chain reversal guide radius or a large spacing between the forward and return runs, because of the gain of space within the machine housing. Machines with this arrangement also offer a good accessibility for maintenance and cooling of the chain track. On the other hand, such an arrangement has the great disadvantage that the chain track segments comprise the common rigid parallelogram structure with large separation distances between the parallel elements. Whenever a lateral adjustment of the forward or advance runs of the chain track is to be carried out for setting the desired web width, it is unavoidable that the external return chain track runs are laterally adjusted as well. For this purpose, the return chain track run as well as the forward chain track run must be divided into chain track segments which are connected by articulated elements. Long extensions of the adjustment spindles, which protrude externally, are necessary. In this case also, the supply of coolant must be flexibly or movably arranged to allow the lateral adjustment of the chain tracks. Because of these requirements, a considerably large free space is needed on both sides of the film stretching machine, even just for the full lateral adjustment motion of the return chain tracks. Furthermore, a minimum clearance distance between the housing and the return chain track or run is required for working on various elements of the housing, such as blower or ventilator devices which are mounted to tilt away from the housing. Therefore, this arrangement is very inefficient in cost, materials, and space.

German Patent Publication No. 3,443,905 corresponding to U.S. Pat. No. 4,639,984 (Langer) discloses direction reversing tentering chain guide arrangements suitable for the present purposes.

OBJECTS OF THE INVENTION

In view of the foregoing it is the aim of the invention to achieve the following objects singly or in combination:

to construct the tentering chain track arrangement of a film stretching machine in such a manner that the advantages of an external chain return are retained while the disadvantages of the known external return are avoided;

to achieve a reduced space requirement for the film stretching machine by providing a compact chain track arrangement, yet providing a large lateral adjustment capability for the chain tracks;

to allow the use of a large radius chain guide sprocket for a compact chain track arrangement;

to provide easy accessibility to the machine housing and the chain track for maintenance;

to reduce heat losses from a tentering machine housing by cooling the return chain portion externally of the housing, and by allowing the inlet and outlet slots through the housing to be reduced in size; and to construct a tentering chain return track which is economical and reliable, yet structurally simple.

SUMMARY OF THE INVENTION

The above objects have been achieved in a tentering chain track arrangement for tentering machines enclosed in a housing as generally described above, especially for tentering machines used for widthwise stretching of synthetic material films. According to the invention, the chain track sections for the return run of the tentering chain are arranged outside of the machine housing, in a rigid and fixed orientation relative to the housing. Furthermore, the chain reversal guide arrangement at each end of each chain track includes a laterally movable, outer guide portion, which is articulated or hinged at one end to a transition guide track member and at its other end to the respective fixed return track section. The transition guide track member guides the chain from its forward path into its fixed return path. The transition guide track member is displaceable together with the forward run of the chain track sections.

Because the return chain track sections are rigidly arranged extern to the housing according to the invention, the return track sections do not participate in the lateral adjustment motions carried out by the internal forward track sections. Thus, the external return track sections may be so arranged to provide only the above mentioned minimum required clearance distance between the track and the housing. A free space for adjustment motions is not required along the sides of the tentering machine. Large and costly adjustment spindles with articulated chain track journals are not required. Nonetheless, a large width adjustment of the tentering area is possible through adjustment of the chain reversal guide arrangements. Any width adjustment displacement is taken up by the straight transition guide track portion hinged to the laterally outer transition guide track member of the reversal guide arrangement and to the respective return track section. Advantageously, the length of the transition guide track portion is chosen so that any necessary length compensation between the track portion end tilting along an arc and the transition guide track member of the linearly slidable reversal guide arrangement connected thereto is taken up by the characteristics and by the structural play of the member and of the portion. That is to say that the transition guide portion is sufficiently long or has length compensating means at least at one of the journals or hinges that any discrepancy between the arcuate motion of its end and the linear motion of the reversal guide track member of the arrangement is sufficiently small to be taken up by the play of the hinges or journals or by the length compensating means.

According to a further feature of the invention, the return chain track sections extend essentially linearly, but angled bends may be provided where necessary to better fit the track to the contour of the machine housing so as to provide the necessary minimum clearance space between the external chain track and the housing, while achieving the greatest possible space efficiency. The chain track may be made of known uniformly flexible track rail members, whereby the articulated connections or hinges at both ends of the straight transition guide portion and the angled bends in the return track sections are gently bridged in the manner known for bridging such bends in the forward advance track sections. Thus, a continual shock-free motion of the tentering chains and attached tentering clamps is achieved. The principle of the invention is independent of the specific construction, support, or guidance of the tentering clamps. The invention may be applied to film stretching machines having blowers for warm air circulation arranged on the top or bottom of the machine, as well as to machines having blowers mounted on the side walls whereby the blowers are tiltable or swingable outwardly away from the wall for maintenance.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
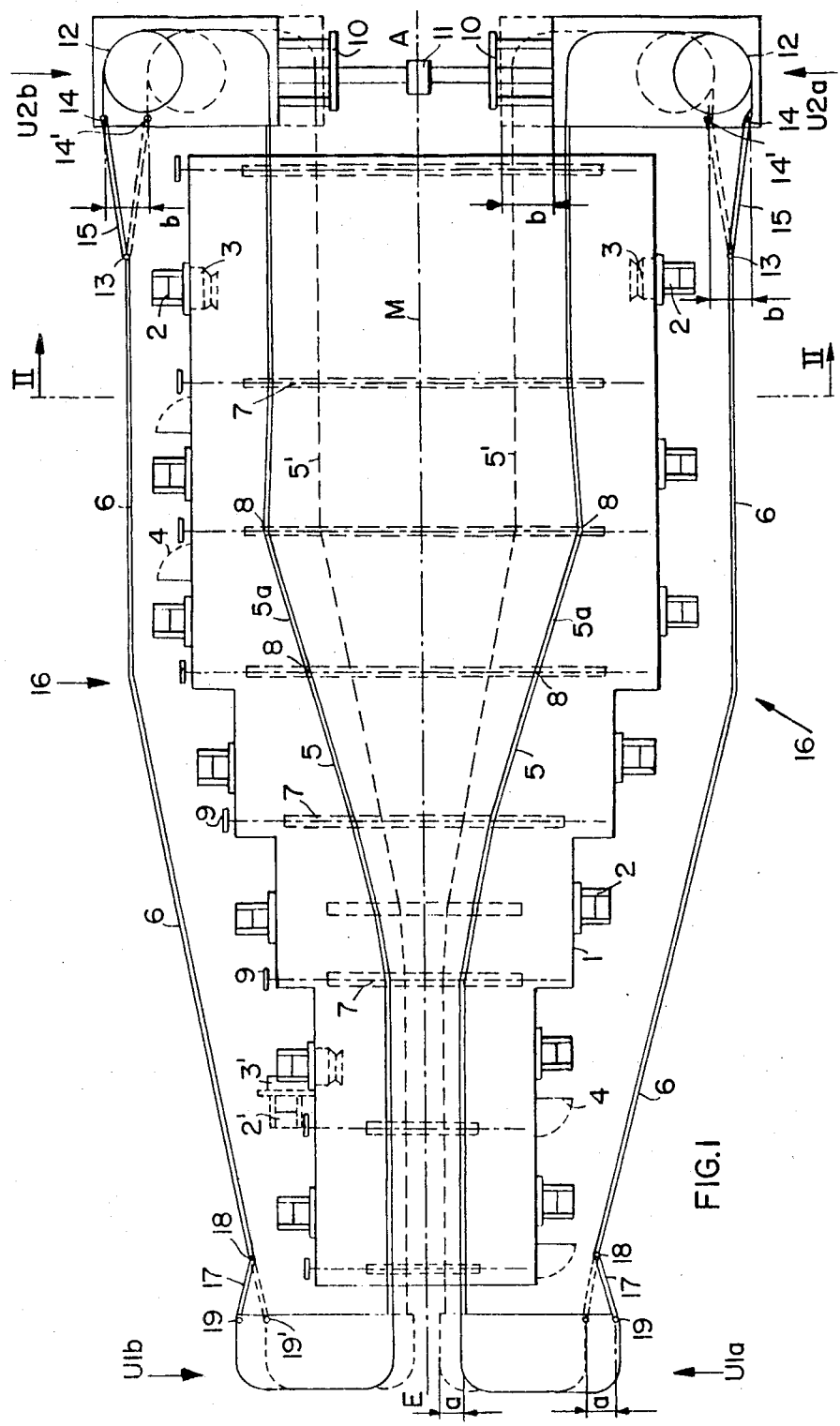
FIG. 1 is a schematic plan view of a film stretching machine schematically showing the path of the tentering chain track according to the invention.

Referring to FIG. 1, the overall structure of the film stretching machine improved according to the invention will now be described. The film stretching machine is enclosed to a large extent by a housing 1. As is typical, the housing 1 is divided into several zones or fields between the housing inlet E and the outlet A. Some of the zones are stepwise wider than the previous zone as seen in the film transport direction from inlet E to outlet A. The lengthwise mid-plane M of the machine and also of the web to be stretched is shown by a dash-dotted line, which simultaneously indicates the centerline of the material or film web to be treated. The separate zones are not described in any detail, because they are known as such, and because they are not directly related to the invention. The separate zones are appropriately equipped with means for circulating air or some other gaseous treatment medium, of which only a few blowers 3 are shown by dashed lines. A drive motor and circuit box 2 is associated with each blower 3. The circuit boxes and blowers may be swung away from the housing 1, as shown at 2' and 3' respectively, for performing maintenance work. Access doors 4 are provided in the wall of the housing 1, to allow access to the interior of the machine. The various means for blowing the treatment medium against the film web are not shown for reasons of clarity and because they are not directly related to this invention.

Threaded spindles 7 are arranged in the separate treatment zones in an essentially known manner perpendicularly to the direction of transport of the film material web. By means of the threaded spindles 7, the tentering chain tracks inside the housing 1 may be adjusted in position and in their path for accommodating different width webs and for adjusting the crosswise stretching ratio. For example, hand wheels 9 are attached to the ends of the spindles 7 protruding outside the housing 1 for manually making the adjustment mentioned above. Only the forward or advance track section or run 5 is provided inside the machine housing 1 for guiding an endless-loop tentering clamp chain, while the reverse or return track section or run 6 extends outside the housing 1. The forward track section or run 5 is divided into several segments in a typical manner, whereby two adjacent segments are interconnected by articulated joints 8. The forward and return track sections or runs 5 and 6 are both shown by double lines, while the articulated joints 8 are shown schematically as a simple point. The joints 8 are only referenced for an example track segment 5a, but bound the ends of each segment at the locations of the spindles 7. The joints 8 are arranged mirror-symmetrically about the mid-plane M along both edges of the material web. These joints are further operatively connected to the spindles 7, so that rotation of the hand wheels 9 and hence of the spindles 7, results in the adjustment of the forward chain track section 5 from the double full line position for the widest possible web to the position 5' for the narrowest possible web as shown by single dashed lines, or to any intermediate adjustment position not shown.

A chain reversal guide arrangement U1a, U1b is provided directly outside of the housing 1 at the inlet end E of the film stretching machine for each endless or closed-loop tentering chain, one of which extends along each edge of the film material web. These reversal guide arrangements U1a and U1b are lateral slidable, along with the forward track section 5, to the extent of an adjustment range or distance -a- extending perpendicularly to the central plane M. The adjustment distance -a- corresponds to half of the difference between the maximum and minimum processable inlet width of the material web. Such reversal guide arrangements are known as such in the art, and will not be more closely described here. Corresponding reversal guide arrangements U2a and U2b are similarly provided at the outlet end A of the film stretching machine. In a manner known in the art, and similar to the guide arrangements U1a, U1b, the guide arrangements U2a and U2b are slidable perpendicularly to the material web to the extent of an adjustment range or distance -b-. The adjustment distance -b- corresponds to half of the difference between the maximum and the minimum outlet width of the material web. The specific structure of the guide arrangements U1a, U1b; U2a, U2b may be selected as desired from the art. For example, the two guide arrangements may be of the type disclosed in the above mentioned German Patent Publication (DE-OS) No. 3,443,905. As described therein, each guide arrangement comprises two guide bows or arcs with a straight guide piece interposed between the two bows or arcs, whereby the straight guide piece has a fittable or exchangeable length. In the reversal guide arrangements U2a, U2b the laterally outer guide bow leading to the return track section or run 6 comprises a chain sprocket 12, which simultaneously serves as a drive sprocket for the tentering chain. The possibility of laterally or crosswise sliding the reversal guide arrangements U1a, U1b; U2a, and U2b, together with the connected forward track sections 5, is shown by dashed lines 5'. In order to allow such a lateral sliding adjustment, a frame 10 also shown in FIG. 2 comprising sliding rails is provided as a component of the reversal guide arrangements U2a, U2b. The drive arrangement 11, located between the two reversal guides U2a and U2b at the outlet end A of the machine, drives the chain drive sprockets 12 for advancing the tentering chains and the frames 10 to achieve the lateral adjustment of the guide arrangements U2 along the rails of the frames 10. For this purpose, drive spindles may engage the respective frame 10 through a coupling clutch, not shown, and the respective sprocket 12 also through an engaging clutch or the like not shown.

As mentioned above, the return track section 6 on each side of the machine is arranged outside of the housing 1 in a stationary manner with a fixed orientation and position relative to the housing 1. In FIG. 1, the fixed external return track sections 6 are shown by double solid lines. In order to allow access to the circuit boxes 2 and to the doors 4 regardless whether they are open, dashed line position 2', or closed, full line position 3', each return track section 6 extends at some minimum clearance or distance from the housing 1. In principle, each return track section 6 extends linearly and is not divided into several track segments as is the case for the forward track sections 5. In case of a completely straight run of the return track sections 6 parallel to the machine mid-plane M, the reversal guide arrangements U1a and U1b at the inlet E would have to be so wide that its articulated connections 19 to the respective outer guide portion 17 of the return track 6 would be approximately as far away from the mid-plane M as is the articulated connection 14 connecting the respective outer guide portion 15 of the respective return track 6 to the reversal guide arrangement U2a, U2b. Such a structure could be achieved by reversal guide arrangements according to the disclosure of German Patent Publication (DE-OS) No. 3,443,905, because the straight guide piece positioned between the two guide bows of each guide arrangement can have any length as desired or required by operating conditions. However, advantageously, the shape of the return tracks 6 is fitted to the outside contour or shape of the housing 1. For example, the return tracks 6 may extend linearly between the reversal guide arrangements U2a, U1a and U2b, U1b, at a uniform angle corresponding to the difference between the outlet width and the inlet width of the web. In another example, as shown in FIG. 1, an outlet end portion of each return track 6 extends essentially in parallel to the mid-plane M, and then at approximately half the length of the machine, each track 6 comprises a bend 16 leading to an inlet portion extending at a uniform angle fitted to the general shape of the housing 1.

The transition between a laterally slidable chain reversal guide arrangement or member and the stationary return track 6 will now be described with reference to the upper right-hand end of the film stretching machine. A straight transition guide track portion 15 is connected at one end by an articulated connection or journal 13 to the fixed return chain track section 6 and at the other end by a journal 14 to a connection point of the chain reversal guide arrangement U2b. The straight guide portion 15 is pivotable about the journal 13 when the reversal guide U2 is slidably displaced in a direction perpendicular to the mid-plane M. Because the sliding motion of the guide arrangement U2 is linear, while the motion of the swinging end at 14 of the straight guide portion 15 is arcuate, a variable length or radial difference arises between the circular arc and the linear chord of that arc. This length difference is generally small, and especially for a sufficiently long straight guide portion 15, that is for a sufficiently large radius about the journal 13, the length difference is taken up by the arrangement, specific structure, or play of the components. In the case where it may be necessary, special measures may be taken or special components may be provided to take up the length difference, for example a pivotable piston cylinder device is suitable for this purpose. Such measures are well known in the art and require no further description here. Advantageously the journal 13 at the stationary end of the guide portion 15 attached to the stationary return track 6 should be positioned laterally at the midpoint of the adjustment range -b- of the reversal guide arrangement U2. With other dimensions held the same, such a position of the journal 13 minimizes the length difference arising during sliding of the guide arrangement U2a, U2b.

The connection of the return track 6 to the chain reversal arrangement U1a, U1b at the machine inlet E is achieved in an analogous manner, by means of a straight transition guide portion 17, which is connected at one end by a journal 18 to the return track 6 and at the other end by a journal 19 to a connection point of the reversal guide arrangement U1a, U2b. Depending on operating and structural requirements, the length of the guide member 17 may be the same as or different from the length of the guide member 15 at the outlet end reversal guide arrangement U2a, U2b. The journals 13 and 18 may lie along an extension of the line of the adjustment spindles 7, so that they are aligned with the articulated connections 8 of the forward track section 5. This feature is not required however, and instead, the position of the journals 13 and 18 or rather, the length of the transition guide portions 15 and 17, may be any most useful or desirable length determined by consideration of the width adjustment distance -a- at the inlet E and -b- at the outlet A of the machine.

The construction of the tentering clamp chain track according to the invention is independent of the specific type of guide rails used for the tentering clamps. Therefore, the guide rails for the tentering clamps are not shown or described here. The use of known, continuously flexible, spring steel bands arranged as packets and clamped onto the chain track achieves the known advantages of smooth and gapless transitions in the forward track sections as well as in the return track sections. Not only the bend regions 16, but also the transitions from and to the reversal guide arrangements U1a, U1b; U2a, U2b with their articulately connected guide portions 15 and 17 can benefit from these advantages, and simultaneously achieve the necessary compensation of the length difference described above.

Figure 2:
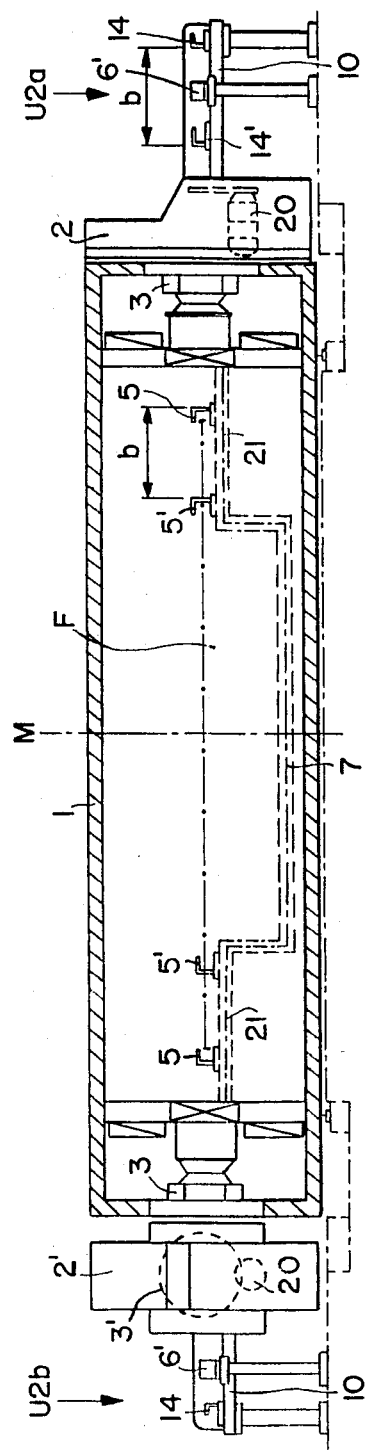
FIG. 2 is a cross-sectional view along the line II—II of FIG. 1.

FIG. 2 shows a cross-section through a film stretching machine, near the last treatment zone and the outlet end A of the machine, along the line II—II of FIG. 1. The machine is arranged on a foundation and enclosed by a housing 1 as shown. Ventilation cells or ducts with means for circulating the treatment medium, especially for delivering heated air, are provided at both sides of the housing 1, but are not referred to in detail. The means for circulating the treatment medium are represented by blowers 3 with their associated circuit boxes 2. Drive motors 20 for the blowers 3 are housed in the circuit boxes 2. On the left side of the machine, a blower 3' and circuit box 2' are shown in their swung-away open position for maintenance access, for example. Throughout the drawing, the necessary blower ducts and nozzle arrangements for blowing the heated air against the material web to be treated are not shown for the sake of clarity. These various arrangements are not directly related to the present invention. The machine mid-plane M is simultaneously the centerline plane of the material web to be treated and is shown by a dash-dotted line. In the right and left portions of the machine near the blower ducts, support members 21 are shown schematically with part of a threaded adjustment spindle 7 for respectively supporting and laterally displacing the forward chain track section 5. The forward chain track 5 is shown by solid lines as a U-shaped carrier in the position of maximum web width adjustment. The dashed line representation of the forward chain track, reference by 5', is the same track as at 5, but adjusted to the position for minimum web width. The adjustment range -b- between the positions 5 and 5' of the forward track section corresponds to half of the difference between the maximum and minimum web widths at the machine outlet after treatment of the web. This adjustment distance -b- is the lateral adjustment range of the chain reversal guide arrangements U2a, U2b as described above. Guide rails for the tentering clamps are provided in the U-shaped chain track carriers in an essentially known manner and are not shown here. The film web F is stretched or supported under tension between the tentering clamps of the left and right forward chain runs which are guided on the respective left and right forward chain track sections.

Outside of the housing 1 to the left and right sides, the return track section 6 is embodied as a closed channel 6' supported by stands which are not shown in detail. As shown, the return chain track 6 extends along the housing 1 at a minimum appropriate clearance distance from the housing, so as to allow access to the film stretching machine for maintenance and repair work. The minimum clearance distance allows clearance and access to the doors 4 in the open and closed states as well as to the blowers 3 and circuit boxes 2 also in the tilted open states 3' and 2'. Because of this clearance spacing arrangement, the accessibility of the return chain track 6 is excellent. The return track 6 may be either partially or completely open, or may be completely covered to form a closed channel track 6' as shown. A closed channel track 6' is especially suited to ducting a cooling medium through the channel for sufficiently cooling the tentering chains during the return path travel. Such a channel may extend over the connection journals 13 and 18, and along the guide track portions 15 and 17, which is not shown here however.

Further in FIG. 2, parts of the chain reversal guide arrangements U2a, U2b are shown behind the return chain tracks 6 to both sides of the machine. The frame 10 with slide rails for the lateral adjustment of the guide arrangements U2a, U2b is shown. In each guide arrangement, the connection journal 14 of the reversal guide bow or arc leading to the return guide track is also shown. However, the articulating connection details are not shown, since such pivoting connections as such are known. The connection journals 14 are in the form of U-shaped carriers for the guide rails which are not shown. The connection journal 14 shown with solid lines represents the journal at the adjustment position for the maximum material web width. The connection journal is shown with dashed lines at 14' at a distance -b- away from position 14 to represent the journal at the adjustment position for the minimum material web width. The straight transition guide portions 15 leading from the journals 14 to the return tracks 6, as well as the corresponding connecting journals 13, are not shown in FIG. 2.

Although the invention has been described with reference to specific example embodiments, it will be appreciated, that it is intended to cover all modifications and equivalents within the scope of the appended claims.

What we claim is:

1. A tentering chain track for tentering clamps forming part of two endless chains travelling in a closed loop in a tentering frame, comprising housing means for enclosing a treatment chamber having an inlet and an outlet, each of said endless chains having a forward run passing from said inlet to said outlet through said treatment chamber and a return run passing outside said housing from said outlet to said inlet, position adjustable direction reversing means located at said inlet and said outlet for leading said return run into said forward run at said inlet and for leading said forward run into said return run at said outlet, first means for adjusting the position of said direction reversing means in a direction substantially perpendicularly to a forward travel direction of said forward runs, second means for adjusting a horizontal spacing between said forward runs inside said treatment chamber, means for mounting said return runs in fixed positions outside said housing means, movable track guide portions (15, 17) located between said fixed return runs and said position adjustable direction reversing means, first articulating means for operatively connecting said track guide portions to said fixed return runs, and second articulating means for operatively connecting said track guide portions to said position adjustable reversing means.

2. The tentering chain track of claim 1, wherein said first articulating means are located on a line extending perpendicularly through the middle of a line connecting end points of an adjustment range (a, b) of the respective position adjustable direction reversing means.

3. The tentering chain track of claim 1, comprising a plurality of track sections, pivoting means (8) interconnecting said track sections, and flexible guide rails for bridging said pivoting means and said first and second articulating means.

4. The tentering chain track of claim 1, wherein said second articulating means comprise means for permitting a relative movement between said position adjustable reversing means and the respective movable track guide portion.

5. The tentering chain track of claim 4, wherein said second articulating means comprise telescoping means for compensating a variable distance between a pivoting point of said first articulating means and a pivoting point of said second articulating means to thereby permit said relative movement.

6. The tentering chain track of claim 1, wherein said return run of said track comprises several fixed track sections extending at an angle relative to each other, whereby said fixed track sections follow approximately a contour of said housing.

7. The tentering chain track of claim 1, further comprising cooling means for cooling said return run of said track.

8. The tentering chain track of claim 1, wherein said return run of said track comprises a substantially closed channel (6') for passing a cooling medium through said substantially closed channel.

* * * * *